UNITED STATES PATENT OFFICE.

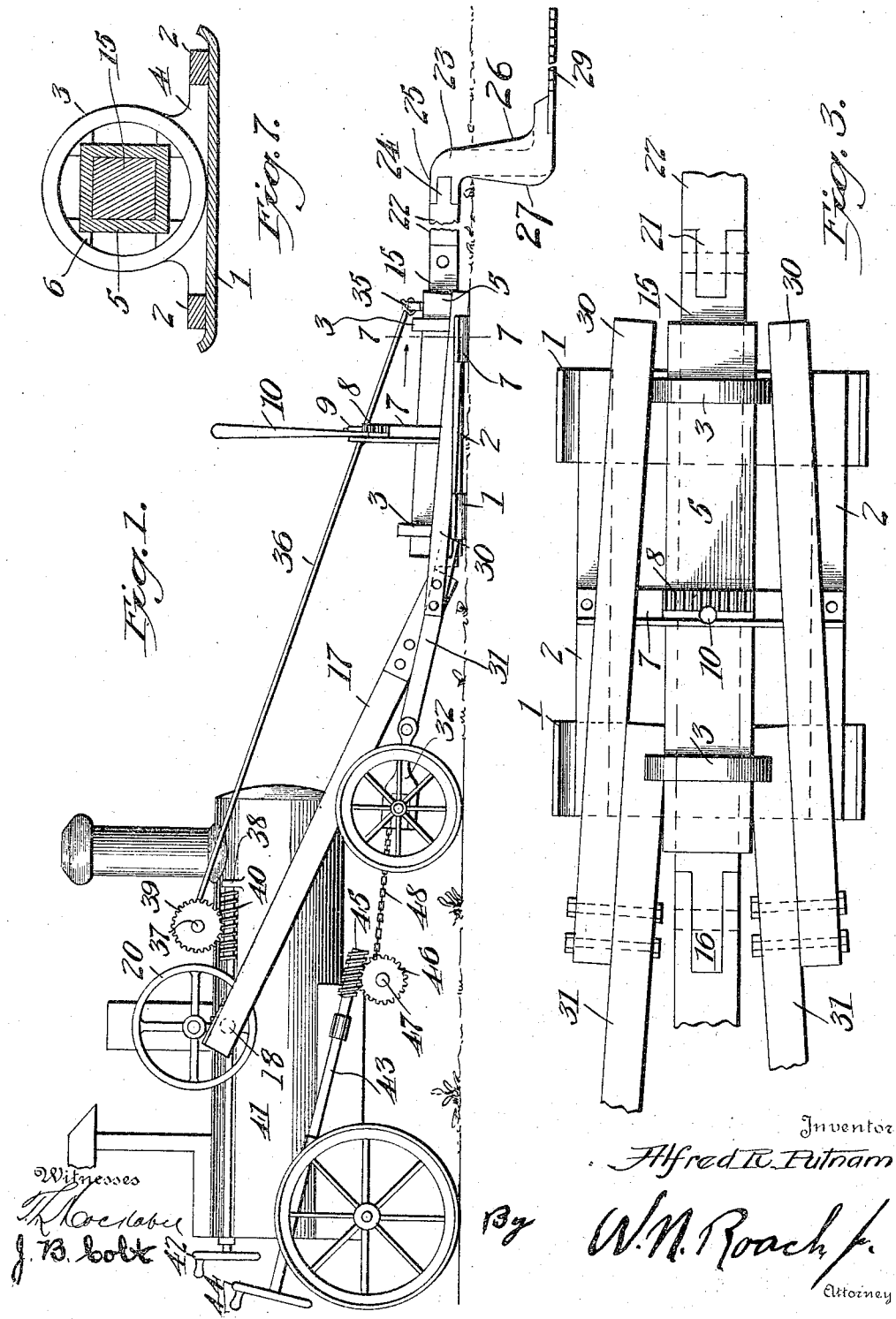

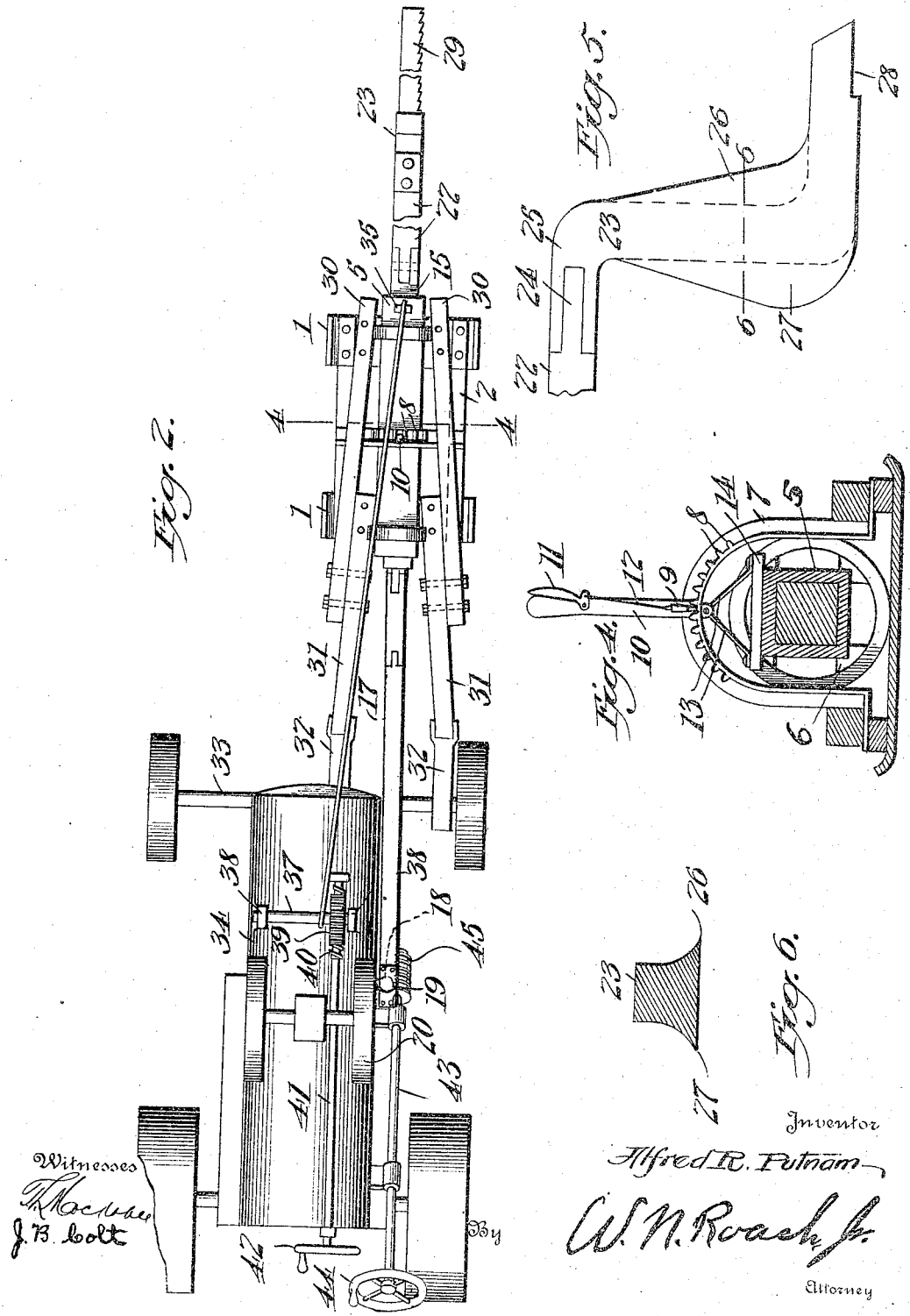

ALFRED R. PUTNAM, OF VALPARAISO, INDIANA.

DRAG-SAW.

1,212,678.  Specification of Letters Patent.  Patented Jan. 16, 1917.

Application filed July 28, 1914. Serial No. 853,621.

*To all whom it may concern:*

Be it known that I, ALFRED R. PUTNAM, a citizen of the United States of America, residing at Valparaiso, in the county of Porter and State of Indiana, have invented certain new and useful Improvements in Drag-Saws, of which the following is a specification.

This invention relates to motor driven drag saws and, more particularly, to a saw of this character intended, primarily, to cut stumps under ground, though also adaptable to cutting standing timber, sawing logs and the like.

The objects of the invention are:—to provide a drag saw which may be operated to saw beneath the surface of the ground for the purpose of removing stumps therefrom; to provide a drag saw which may be readily attached to or removed from an ordinary traction engine; to provide a drag saw with means for tilting the saw at desired angles; to provide a drag saw which may be transported from place to place by the engine to which it is connected without the removal of any part or parts of said saw; to provide a drag saw of simple and cheap construction which will be efficient and accurate in its operation.

With these and such other objects, as may hereinafter more fully appear, my invention consists in the novel arrangement and construction of parts set forth in the following description, more particularly pointed out in the claims, and which are shown in the accompanying drawings, wherein:—

Figure 1 is a side elevation of the device showing the same in place on a traction engine. Fig. 2 is a plan view of the same. Fig. 3 is a broken plan view of the skids and saw tilting mechanism. Fig. 4 is a detail sectional view taken on the line 4—4 of Fig. 2. Fig. 5 is a detail side elevation of the saw carrying head, or bracket. Fig. 6 is detail cross sectional view taken on the line 6—6 of Fig. 5. Fig. 7 is a detail sectional view taken on the line 7—7 of Fig. 1.

Referring to said drawings by numerals, upon suitable skids 1, which are joined together by the braces 2, are mounted circular bearings 3 which are secured to said skids through their bases 4, by means of bolts, screws, or in any other desired manner. Mounted within said bearings 3 is a hollow rectangular casing 5 provided, on its edges at the points where it passes through said bearings, with the ears, or lugs 6, the outer portion of said lugs being formed in an arc to engage the inner face of the casing 3.

Bearings 3 are by preference lined with Babbitt metal, and the lugs 6 are faced with the same material.

Mounted on the aforesaid braces 2, about midway thereof, is a quadrant 7, provided with teeth 8 which are adapted to be engaged by a spring catch 9 carried by a lever 10 and operated in the usual manner by the hand grip 11 and rod 12. Lever 10 is of substantially Y form and has the ends of its branch arms 13 suitably secured to the ends of a bar 14 which is made fast to the case 5 in any suitable manner.

Mounted to reciprocate within casing 5, is a rod 15, one end of which is reduced to form a tongue 16 adapted to enter the bifurcated end of a pitman 17 to which it is pivotally connected. Pitman 17, at its opposite end, is provided with a socket for the reception of a ball 18 formed on the end of a crank 19, which said crank is suitably clamped to a spoke of the fly wheel 20 of the engine. The forward end of rod 15 is bifurcated to receive a tongue 21 formed on an extension rod 22. The connection between said rods being pivotal, as shown.

An angular saw head 23 is secured, in any suitable manner but, preferably, a horizontally disposed tongue 24 is formed on the end of extension rod 22 and is adapted to enter the bifurcated end 25 of the saw head 23. The saw head is detachably fastened to extension rod 22, by screws, or in any other suitable manner, so that the same may be easily removed and the saw secured in place beneath the tongue 24 when it is desired to cut standing timber or do other work above the surface of the ground.

The saw head 23 is angular as shown, to permit the saw to cut below the surface and has its downwardly extending portion formed with a curved face on its front and back, terminanting at one side in the cutting edges 26 and 27. The curve of said faces resembles the curve of a plow share and the object thereof is to permit said saw head to cut its way through the soil as will be hereafter explained. The saw head 23 is undercut, as indicated at 28 for the purpose of receiving the saw 29 which is fastened to said head by screws, or in any other suitable manner.

Braces 30 have one end of each bolted, or otherwise suitably fastened to the foremost skid 1, and the other ends bolted to braces 31 which have one end of each fastened by bolts, or otherwise to the rear skid 1. The other ends of said braces 31 have pivotal connection to suitable clamps 32 which are adapted to engage the front axle 33 of the engine 34 and to be clamped in place thereon in any suitable and well known manner.

The forward end of casing 5 is provided with an upstanding apertured member 35 to which is secured one end of a chain or cable 36, the other end of which is made fast to a shaft 37 journaled in brackets 38, suitably fastened to the boiler of the engine 34. Shaft 37 carries a worm wheel 39 which meshes with a worm 40 formed on a shaft 41, which is journaled in suitable supports formed on the engine and is adapted to be operated by the hand wheel 42.

The engine is provided with the usual steering mechanism consisting of the shaft 43, hand wheel 44 for revolving said shaft, worm 45 formed on said shaft and adapted to engage a worm wheel 46 carried on a shaft 47 to which shaft is secured the steering chains 48.

The device is operated as follows: The clamps 32 are placed in position on the front axle of a traction engine and clamped securely thereon. The crank 19 is clamped to one of the spokes of the fly wheel; the end of chain or cable 36 is fastened to the shaft 37 and, by operating the wheel 42, the chain 36 is wound on the shaft 37 thereby lifting the saw mechanism so that the engine may travel to the place where the sawing operations are to begin. When sawing a stump the saw head 23 is used. The mechanism is lowered until the skids 1 rest upon the ground. The saw is tilted through the lever 10 until it assumes an angle of about forty-five degrees. The engine is then started which causes the saw to be reciprocated, the saw head 23 cutting into the ground. Because of the form of head 23, the edge 26 will cut off a slice of earth on the forward stroke and the edge 27 will perform a like operation on the return stroke, the incline of the faces adjacent these edges forcing the said earth to one side as the saw advances. The advance of the saw is obtained through the steering mechanism of the engine, the front axle being swung to correspond to the advance of the saw. In this manner stumps can be cut to a depth of two feet, or more below the surface, which will insure them being out of the way of a plow. When the stump is sawed, the mechanism is raised in the usual manner and the engine may proceed to the next stump. When standing timber or logs are to be sawed, the head 23 is removed and the saw placed below the tongue 24.

Having described my invention, what I claim as new and desire to secure by Letters Patent, is:—

1. In a drag saw, a suitable source of power, a pitman connected to said source of power, a suitable support, a rod connected to said pitman and slidably mounted on said support, an angular saw head connected to said rod, cutting blades formed on the saw head, and a saw connected to the saw head.

2. In a drag saw, a suitable source of power, a support detachably secured to said source of power, a casing revolubly mounted on said support, a rod slidably mounted in said casing, a pitman connecting said rod to said source of power, an angular saw head connected to said rod, cutting blades formed on said saw head, and a saw connected to said saw head.

3. In a drag-saw, a suitable source of power, braces detachably connected to said source of power, skids attached to said braces, a casing revolubly mounted on said skids, a rod slidably mounted in said casing, a pitman connecting said rod to said source of power, a saw connected to said rod, and mechanism for revolving said casing to revolve the saw on its longitudinal axis.

4. In a drag-saw, a suitable source of power, driving mechanism connected to said source of power, skids connected to said driving mechanism and adapted to support the same upon the ground, a saw connected to said driving mechanism, mechanism mounted on said skids for revolving the saw on its longitudinal axis, and means for lifting said driving mechanism when the same is to be transported.

5. In a drag-saw, a suitable source of power, saw driving mechanism connected to said source of power, a support for said driving mechanism, a casing mounted on said support, and mechanism for revolving said casing to revolve the saw on its longitudinal axis.

6. In a drag-saw, a suitable source of power, saw driving mechanism connected to said source of power, a saw head connected to said driving mechanism, and means carried by said head for cutting earth on one side of the head and transferring such cut earth to the opposite side of the head.

In testimony whereof I hereunto affix my signature in presence of two witnesses.

ALFRED R. PUTNAM.

Witnesses:
P. S. HUBER,
M. L. FETT.